(12) United States Patent
Khatami et al.

(10) Patent No.: US 11,631,012 B2
(45) Date of Patent: Apr. 18, 2023

(54) METHOD AND SYSTEM FOR IMPLEMENTING SYSTEM MONITORING AND PERFORMANCE PREDICTION

(71) Applicant: Oracle International Corporation, Redwood Shores, CA (US)

(72) Inventors: Zahra Khatami, San Jose, CA (US); Avneesh Pant, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 322 days.

(21) Appl. No.: 16/917,720

(22) Filed: Jun. 30, 2020

(65) Prior Publication Data
US 2021/0406726 A1    Dec. 30, 2021

(51) Int. Cl.
*G06F 16/44* (2019.01)
*G06N 5/04* (2006.01)
*G06F 17/17* (2006.01)
*G06N 20/00* (2019.01)

(52) U.S. Cl.
CPC ............... *G06N 5/04* (2013.01); *G06F 17/17* (2013.01); *G06N 20/00* (2019.01)

(58) Field of Classification Search
CPC .......... G06N 20/00; G06N 5/04; G06N 20/20; G06F 11/3452; G06F 3/0484
USPC ............................................................ 706/12
See application file for complete search history.

(56) References Cited

U.S. PATENT DOCUMENTS

| | | | |
|---|---|---|---|
| 10,409,789 B2* | 9/2019 | Zoll | G06F 11/3452 |
| 2017/0372232 A1* | 12/2017 | Maughan | G06F 3/0482 |
| 2018/0081914 A1* | 3/2018 | Zoll | G06F 11/3452 |
| 2020/0311615 A1* | 10/2020 | Jammalamadaka | G06N 20/20 |
| 2020/0366699 A1* | 11/2020 | Sampaio | H04L 63/0428 |

OTHER PUBLICATIONS

Jay, N. et al., "A Deep Reinforcement Learning Perspective on Internet Congestion Control," Proceedings of the 36 the International Conference on Machine Learning, Long Beach, California, PMLR 97, 2019. Copyright 2019 by the author(s).

Cavalcante, C., et al.,"An Approach to Handle Concept Drift in Financial Time Series Based on Extreme Learning Machines and Explicit Drift Detection," IEEE, Copyright 2015.

Dulac-Arnold, G., et al., "Challenges of Real-World Reinforcement Learning," Proceedings of the 36 th International Conference on Machine Learning, Copyright 2019.

Edalat, Y., et al., "Smart Experts for Network State Estimation," IEEE Transactions On Network and Service Management, vol. 13, No. 3, Sep. 2016.

Boracchi,, G., et al., "Exploiting Self-Similarity for Change Detection," FP7 EU project i-Sense, Making Sense of Nonsense, Contract No. INSFO-ICT-270428, copyright 2014.

(Continued)

*Primary Examiner* — Hung T Vy
(74) *Attorney, Agent, or Firm* — Vista IP Law Group, LLP

(57) ABSTRACT

Described is an improved approach to implement an offline learning approach for machine learning that employs a window-based technique for predicting values within the window, and where outliers are identified and discarded from consideration. This approach efficiently permits offline learning to be employed in a manner that minimizes false positives, while also improving the quality of the data should retaining be required.

27 Claims, 16 Drawing Sheets

(56) References Cited

OTHER PUBLICATIONS

Cavalcante, R., et al., "FEDD: Feature Extraction for Explicit Concept Drift Detection in Time Series," IEEE, Copyright 2016.
Sivakumar, V., et al., "MVFST-RL: An Asynchronous RL Framework for Congestion Control with Delayed Actions," 33rd Conference on Neural Information Processing Systems (NeurIPS 2019), Vancouver, Canada.
Edalat, Y., et al., "Network State Estimation Using Smart Experts," ICST, Copyright 2014.
Brockman,, G., et al., "OpenAI Gym," dated Jun. 5, 2016.
Shcherbakov, M., et al., "Outlier detection and classification in sensor data streams for proactive decision support systems," 2017 J. Phys.: Conf. Ser. 803 012143.
Dong, M., et al., "PCC Vivace: Online-Learning Congestion Control," Proceedings of the 15th USENIX Symposium on Networked Systems Design and Implementation (NSDI '18). Apr. 9-11, 2018 • Renton, WA, USA ISBN 978-1-939133-01-4.
Zhao, S., et al., "Real-Time Network Anomaly Detection System Using Machine Learning," 2015 11th International Conference on the Design of Reliable Communication Networks (DRCN).
Zhang, J., et al., "Robust Network Traffic Classification," IEEE/ACM Transactions On Networking, vol. 23, No. 4, Aug. 2015.
Winstein, K., et al., "TCP ex Machina: Computer-Generated Congestion Control," SIGCOMM'13, Aug. 12-16, 2013.
Oliveira, G., et al., "Time Series Forecasting in the Presence of Concept Drift: A PSO-based Approach," 2017 International Conference on Tools with Artificial Intelligence.
McCreary, S., "Trends in Wide Area IP Traffic Patterns," University of California, San Diego, dated Jan. 2000.

\* cited by examiner

METHOD AND SYSTEM FOR IMPLEMENTING SYSTEM MONITORING AND PERFORMANCE PREDICTION

BACKGROUND

Modern computing systems are becoming increasingly large and complex. The horizontal expansion of computing component resources (e.g., more and more computing nodes, more and more storage-oriented devices, more and more communication paths between components, more and more processing modules and instances, etc.) coupled with the proliferation of high-performance component instrumentation results in systems capable of generating extremely high bandwidth streams of data. The problem is that given the size of modern computing systems, it is becoming more and more difficult for administrators to efficiently manage the health and correct operational state of the technology given the quantities and complexities of data being collected for those systems.

Machine learning has been proposed as a solution for managing and monitoring complex computing systems. Machine learning pertains to systems that allow a machine to automatically "learn" about a given topic, and to improve its knowledge of that topic over time as new data is gathered about that topic. The learning process can be used to derive an operational function that is applicable to analyze the data about that system, where the operational function automatically processes data that is gathered from the activity or system being monitored. This approach is useful, for example, when a vast amount of data is collected from a monitored system such that the data volume is too high for any manual-based approach to reasonably and effectively perform data review to identify patterns within the data, and hence automated monitoring is the only feasible way that can allow for efficient review of that collected data.

Machine learning is typically implemented by obtaining a set of training data that is adjudged as being an adequate representative for the system data to be monitored. A learning algorithm then takes that training data and implements a training method to obtain a model for the system, where the model usually corresponds to a predictive model that can hopefully predict future outcomes based upon the past behavior and observed datapoints.

The accuracy of real-world results from the model is highly dependent upon the quality of the data that is selected for the training data. However, a typical computing system during its normal operations may undergo changes to its various components and operational parameters. What this means is that if the data for the model is no longer representative of the current system, then the predictive model that was generated from the older data may no longer provide accurate predictions for the system.

Conventional approaches to address this problem all suffer from various deficiencies. For example, reinforcement learning ("RL") is one approach that can be taken to address this problem. This approach uses a real-time agent to implement reinforcement techniques to monitor and correct the learning system, where the agent initially starts knowing nothing about the task and eventually learns by using reinforcement/reward based on how well it is handling that task. The synchronous RL approach is a technique that uses the same resources as the underlying system being monitored, and hence is non-optimal since it may impose blocking onto the system in its operation. The asynchronous RL technique uses a non-blocking agent, but suffers in its effectiveness due to possible resource constraints.

Another approach that may be taken is to use offline learning methods. These techniques are based on model training that occurs off-line using relatively older (not real-time) data. The offline learning approach requires a model to be updated if the underlying data pattern of a current system becomes different enough from the trained model. Otherwise, the trained model is not able to follow the new pattern properly and it might result in an inaccurate prediction. This concept is known as "model drift", and refers to a model's predictive performance degrading over time due to a change in the environment that violates the model's assumptions. The offline learning method has the potential to resolve the drawbacks with the RL techniques, but unfortunately, known offline learning methods also suffer from their own drawbacks. For example, known offline learning methods will often overestimate the impact of outliers within the dataset, causing a "false positive" situation that incorrectly identifies the training data to be excessively outdated, and hence result in the unnecessary retraining of the predictive model. In addition, the retaining process may result in a less accurate model since the outlier data has now been incorporated into the new model.

What is needed, therefore, is a method and/or system that overcomes the problems inherent in the prior approaches.

SUMMARY

According to some embodiments, the invention provides an improved offline learning approach that employs a windows-based technique for predicting values within the window, and where outliers are identified and discarded from consideration. This approach efficiently permits offline learning to be employed in a manner that minimizes false positives, while also improving the quality of the data should retaining be required.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

According to some embodiments, the invention provides an improved offline learning approach that employs a window-based technique for predicting values within the window, and where outliers are identified and discarded from consideration. This approach efficiently permits offline learning to be employed in a manner that minimizes false positives, while also improving the quality of the data should retraining be required.

For the sake of illustration, and not by way of limitation, the following description and illustrative examples are provided in the context of monitoring and performance improvement for a database management system. The description may further explain concepts by illustratively describing the embodiments of the invention in the context of estimating and monitoring network behavior. It is noted, however, that the invention has applicability beyond just databases and network behavior, and thus is not intended to be limited in its applicability to just these illustrative examples.

Figure 1:
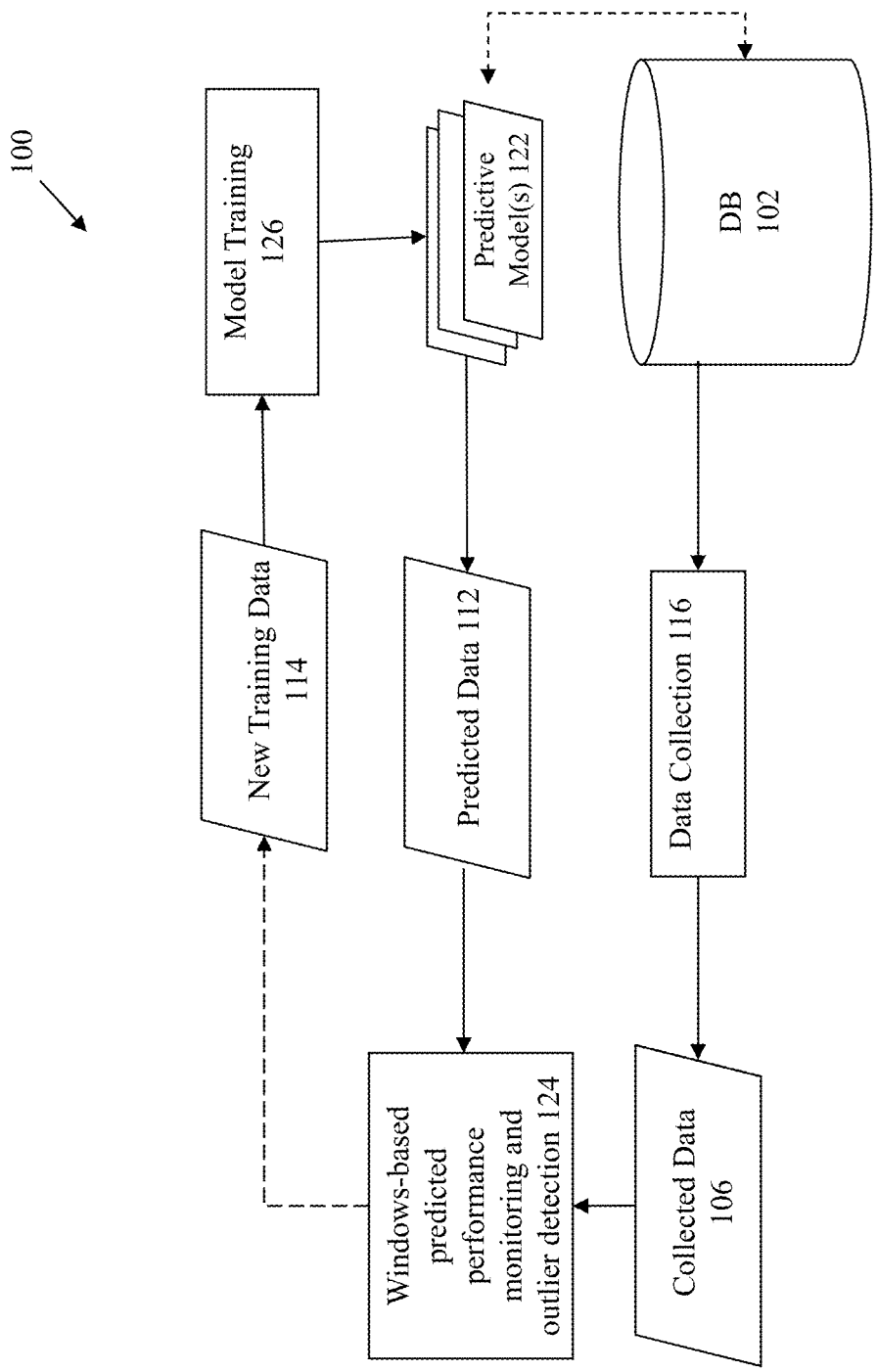
FIG. 1 illustrates a system 100 for selection and cleansing of training data according to some embodiments of the invention.

FIG. 1 illustrates a system 100 for implementing improved monitoring and performance improvement according to some embodiments of the invention. System 100 includes a data collector 116 that collects signal data from a database system 102. Within the database system 102, the system organization may include multiple computing nodes that are interconnected across one or more computing networks. In such a system, the data 106 collected from the database 102 may be signal data corresponding to network traffic between and across the different components in the system. Understanding system dynamics in this type of system is important for predicting system behavior for better managing the system's resources. Such system behaviors might vary over time as they are influenced by different factors.

For maintaining system performance, the system actions should adapt to the system dynamics. For example, congestion control is one of the essential components of computer networks. Estimating network behavior is critical to be effective in controlling congestion, which is important for maximizing throughput, minimizing packet loss, and delivering acceptable performance. Network performance varies over time due to factors such as traffic load, server/client's CPU load, communication link conditions, and/or other similar factors. For properly controlling congestion, network actions should be adjusted to these dynamics. For this purpose, for example, a Transmission Control Protocol (TCP) network will periodically evaluate network congestion by estimating round-trip time (RTT), which is the time between sending a packet and receiving a delivery confirmation from the other end. This permits the TCP network to adjust its parameters such as retransmission time-out and congestion window size according to the network behavior. Hence, accurately estimating RTT based on network dynamics plays an important role in controlling TCP network congestion.

Information containing system attributes can be exploited for a better system dynamics estimation using machine learning. Within system 100, predictive model(s) 122 can be used to implement machine learning techniques for better controlling the performance of the database 102. The predictive models can be used to improve TCP performance in conjunction with networks having, for example, (a) variable bottleneck rates; (b) datacenter networks with high rates, short delays, and correlations in offered load; and/or (c) networks with large bandwidth-delay products.

With the inventive approach, model drift detection is performed at system monitor 124, which may be implemented as a group of processes that take care of forecasting the system's future performance and outlier detection on given data. The given data pertains to the states provided by the database 102 that are stored in a memory region that is accessible for these monitoring processes. These monitoring processes will use the trained model given from the training processes for forecasting and outliers detection on these data.

In particular, the monitor 124 will perform drift detection based on analyzing MSE (Mean Square Error) distribution on the collected data 106. With this approach, within a defined window size, MSE for all data is computed by comparing the predicted value with the real value for each data. In system 100, the predicted data 112 is generated using predictive models 122. Outliers are detected based on the MSE distribution of that data, and where the outliers are then subsequently excluded from the dataset. It is noted that MSE is one example of an averaging function that may be employed in some embodiments of the invention.

The general idea is that if the model is trained well, then the MSE distribution for normal data (with exclusion of the outliers) should stay almost the same for the new upcoming data. However, if the model is not able to accurately predict the data pattern anymore, this would result in an increase in the difference between the real data pattern and the predicted data pattern, which consequently results in a change to the MSE distribution. Therefore, whenever the MSE distribution for normal data is changed over time, this indicates that the trained model cannot properly predict the pattern anymore and thus indicates that the model should be updated.

Because the analysis is done using MSE on a window-by-window basis, this will minimize the occurrence of false positives based upon outliers in the dataset. This approach therefore presents an improvement over conventional offline learning methods that focus only on identifying changes in time-series data or on checking if prediction errors exceed given thresholds, since these conventional approaches will often identify the requirement for model retraining as an overreaction to the presence of an outlier, even if the model should still be sufficiently accurate. In contrast, because the current embodiment employs MSE on a window basis (while also removing outliers from the data under consideration), this means that the current embodiment will be much less likely to react to an outlier as cause for model retraining unless actually warranted.

If, however, the model does need to be retrained, then new training data 114 is created by removing the identified outliers, which is then sent to one or more training processes 126 to perform model training. These processes take care of training updated versions of the models 122 based on the given data to learn the data flow pattern(s). The newly trained models 122 would then be used again by the monitoring process for analyzing the next set of collected data 106.

It is noted that one additional advantage with this approach is that the process of removing outlier data will reduce the amount of information that will need to be processed in subsequent stages of processing. This means that less memory storage will need to be used to store the data being processed, for example, to perform MSE calculations on data windows or for model retraining. The smaller amount of data will also allow a hardware processor to more efficiently and quickly process the information contents to generate the processing results, which will serve to improve the functioning of the computer itself. In addition, removal of the outliers will reduce false positives, which will ensure less resource usage (such as processor and memory resources) by avoiding the need to perform unnecessary model retraining.

Figure 2:
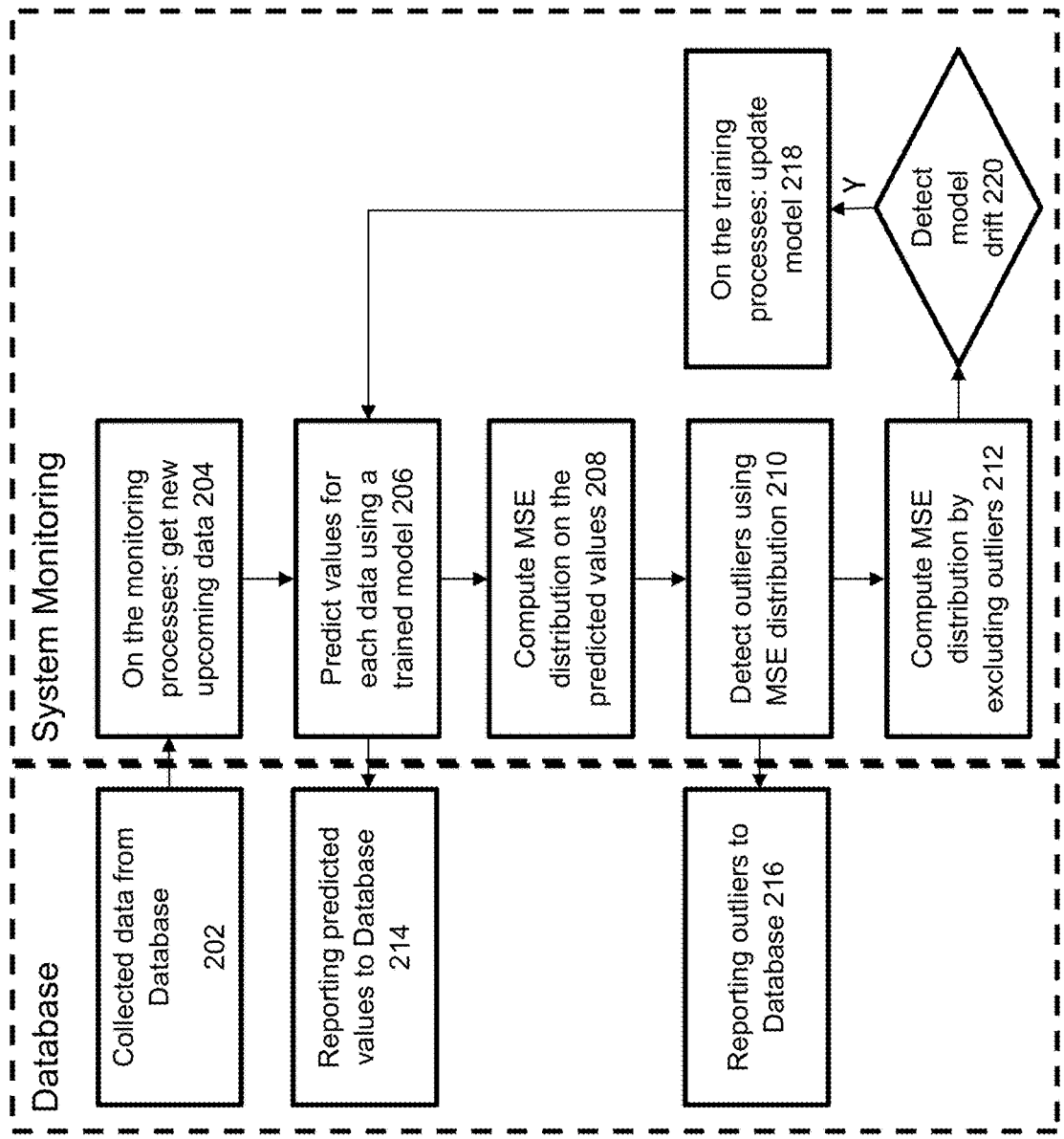
FIG. 2 shows a high-level flowchart of an approach to implement some embodiments of the invention.

FIG. 2 shows a high-level flowchart of an approach to implement some embodiments of the invention. At 202, data is collected from the database. The collected data in some embodiments may include, for example, network traffic data, waiting time data, and memory region grow pattern data for a resource manager. At 204, the data collected from the database system is obtained by the system monitoring component.

Predicted values are generated at step 206. The predicted values are obtained using the trained predictive model(s). At 208, the MSE distributions are computed on the predicted values. As previously noted, the MSE for data is determined for a given window size, where the MSE data is calculated by comparison of the predicted value with the real value for the data. At 210, outliers are detected within the data based on the MSE distribution that was determined in step 208. In some embodiments, the outliers are determined by identifying a specified percentage of the data that least matches the predicted value. For example, one embodiment may operate by to detect outliers by defining normal MSE as the data that lies within 99% of the MSE normal distribution within a window, thereby leaving the remainder 1% as the outliers.

At 212, the outliers are excluded from the dataset, with the MSE distribution calculated based upon the dataset that no longer has the outliers. Detection is then performed at 220 for the presence of model drift. As previously noted, if the model is still accurate, then the MSE distribution for data excluding the outliers should stay approximately the same for the upcoming data. If there is an increase in the difference between the real data pattern and the predicted data pattern causing a change to the MSE distribution, then this indicates that model drift has occurred. If model drift has been detected, then at step 218, the model is updated by the training processes.

Various data values may be provided back to the database. For example, at 214, the predicted performance values may be reported to the database. In addition, at 216, the detected outliers may also be reported back to the database.

This document will now provide a more detailed description of how the invention may be implemented according to some embodiments of the invention.

The inventive embodiment uses a window-based technique for predicting the values in each time step, where the value of each step can be predicted by considering the values of the previous time steps within a specific window size ($win_{look-back}$). Mean Square Error (MSE) is used as a regression loss function in this approach. For detecting outliers, this approach divides data into the fixed size window size ($win_{mse}$) to localize the cause of any anomalies. The MSE for all data within each $win_{mse}$ will get computed, and based on the normal distribution of those MSE in that window, the outliers will be detected.

For a well-trained model, the MSE distribution for normal data excluding the outliers should stay approximately the same for the new upcoming data. An outdated model will not be able to accurately predict the traffic pattern anymore, which results in an increasing difference between the real data flow pattern and the predicted data flow pattern, which will consequently change the MSE distribution. Therefore, whenever the MSE distribution for normal data is changed over-time, this indicates that the trained model cannot properly predict the pattern anymore and that the model should get updated.

The Kolmogorov-Smirnov (KS) approach is used in some embodiments of the invention for comparing the difference between two MSE distributions of normal data. Generally this method is used to test whether two underlying one-dimensional probability distributions differ. In this case, KS is defined as follow equation: "$D\_(n,m)=sup\_x|F\_(1, n)(x)-F\_(2, m)(x)|$", where $F_{1,n}(x)$ and $F_{2,m}(x)$ are the empirical distribution functions of the first and second sample respectively, and $sup_x$ is the supremum function. The empirical distribution function is an estimate of the cumulative distribution function that generated the points in the sample. The null hypothesis is $H_o$, with both samples coming from a population with the same distribution. In KS, the null hypothesis is rejected at significant level $\alpha$ if $D_{n,m} > D_{n,m,\alpha}$, where $D_{n,m,\alpha}$ is the critical value, as follows: "$D\_(n,m,\alpha)=c(\alpha)\sqrt{((n+m)/nm)}$" where $c(\alpha)$ is the inverse of Kolmogorov distribution at $\alpha$.

The threshold parameter a is therefore employed from the KS comparison for detecting the necessity of updating a model. In the model, if the KS becomes higher than $D_{n,m,\alpha}$ in one $win_{mse}$ (KS might become higher than a in one $win_{mse}$), the model might be still compatible with these dynamic pattern change and hence retraining model might not be needed yet. For this purpose, in the current approach, one can consider KS for $\beta$ number of $win_{mse}$. The approach will compute the average distribution function F(x) by calculating: "$D\_(n,m)=sup\_x|1/\beta\ (\Sigma\_\beta(F_{1,n}(x))-\Sigma\_\beta(F_{2,m}(x)))|$"

If $\alpha$ and $\beta$ are set low, this will cause the model to be updated more often, which also results in increasing utilization of resources. On the other hand, setting a high value for the threshold parameter will result in a less updated model, which also results in decreasing utilization of resources. Therefore, using the threshold parameter allows the approach to be flexible for different applications based on the resource availability.

One possible use scenario that demonstrates the advantage of this technique is the situation when the network traffic pattern stays almost the same for a long period of time. Using this approach minimizes the need to update a trained model during that time as it avoids unnecessarily occupying resources. This is an improvement over the known network monitoring based reinforcement learning techniques. On the other hand, if the network traffic changes, e.g., where the TCP protocol itself changes, then the current approach is able to detect when to update a model, which results the learning of the new traffic patterns unlike the known network monitoring approaches based on the off-line learning techniques.

Another advantage of the current approach is that it is particularly well suited and compatible with the traffic changes, since the predicted value is estimated by considering the values of the previous time steps within a specific window size. Therefore, if the traffic pattern changes over time, the current approach is still able to estimate the value by considering the pattern changes. This avoids the need to engage in unnecessary model retraining.

Yet another advantage of this approach is the combining of the outlier detection action with the drift detection action. Unlike the known methods, the outliers are first detected and the prediction errors only get considered for normal data, which results in avoiding or minimizing the need to unnecessarily perform model retraining.

The next portion of the document will now provide an illustrative example of the invention applied to monitoring and detection of network outliers and prediction of network performance for next time steps. The following illustrative embodiment is directed to monitoring specifically of modeling for round-trip time (RTT) data, which in the current embodiment includes performing the following steps: (1) Perform RTT value prediction; (2) Perform MSE percentile computation for the trained model; (3) Perform RTT outlier detection; and (4) Updating trained model if needed.

Figure 3:
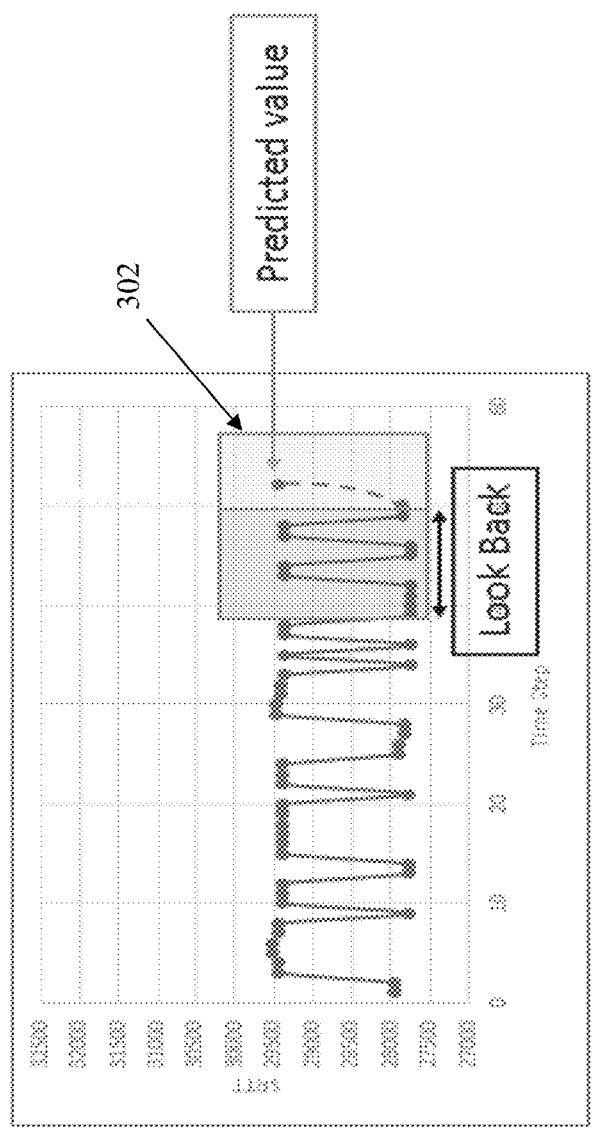
FIG. 3 illustrates a model uses the values from a look back window.

With regards to the step of performing RTT value prediction, consider that network RTT data is a time-series data, where the data is indexed in time-order. With this type of data, the sequence of the values is important. Therefore, for training a time-series model, the value of each step can be predicted by considering the values of the previous time steps. For the purpose of this embodiment, "look_back" is the name that is applied to this previous values window look up. FIG. 3 illustrates that the model uses the values from the $win_{look\text{-}back}$ 302 for predicting a new value. There are numerous approaches that can be taken to predict a time-series data pattern. One possible approach is to use the Keras LSTM library which is a type of recurrent neural network. In this model, one can use, for example, 1 hidden layer with 25 neurons and 400 epochs.

Figure 4:
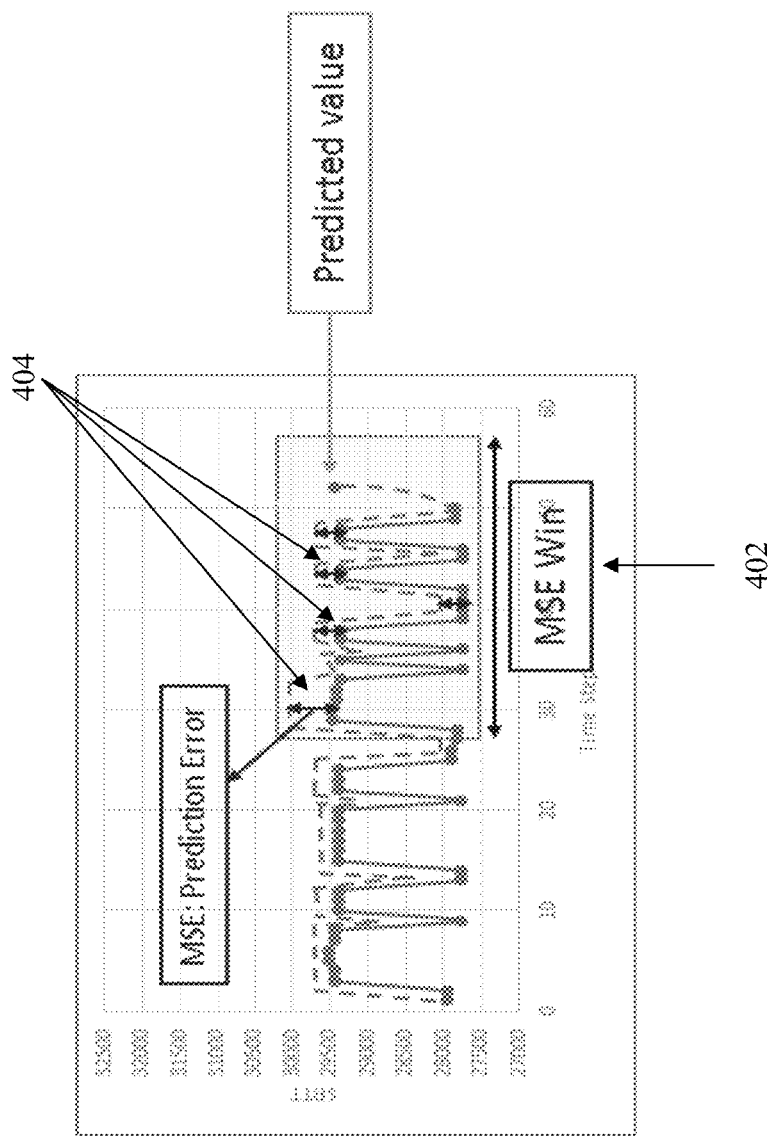
FIG. 4 illustrates a MSE (Mean Square Error) percentile computation for a trained model.

With regards to the step of performing MSE percentile computation for the trained model, the current embodiment uses MSE as a regression loss function. MSE is the summation of the squared distances between the real value and the predicted one. In the current approach, for detecting outliers, data is divided into the fixed size windows ($win_{mse}$) to localize the cause of anomaly within each window. This window based technique allows one to identify the localized anomalies in the smaller data subsequences. As shown in FIG. 4, a solid line shows the real data pattern and a dotted line shows the predicted pattern. The MSE between each data within the window 402 ($win_{mse}$) are shown at 404.

Figure 5:
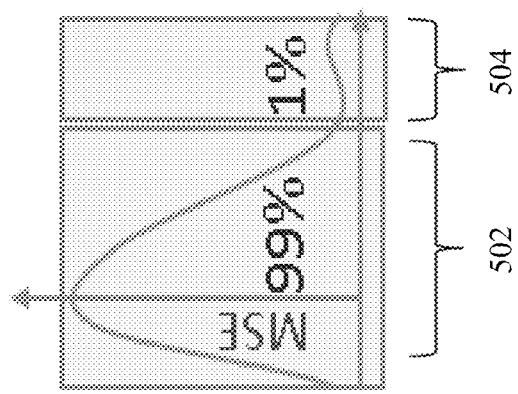
FIGS. 5 and 6 illustrate outlier detection.
Figure 6:
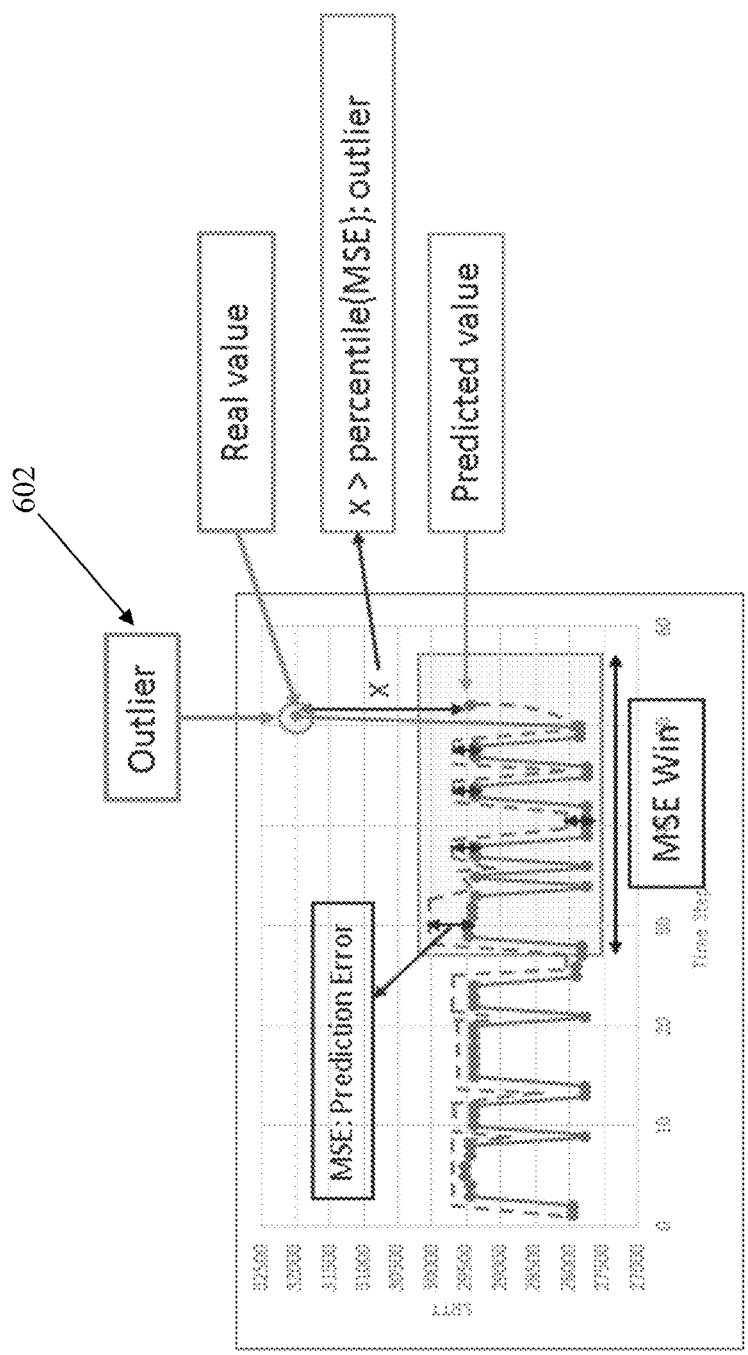

With regards to the step of performing RTT outlier detection, MSE for all data within each $win_{mse}$ are computed. Based on the normal distribution of those MSE values in that window, the outliers would be detected. A threshold percentage can be selected for determining whether or not a value is an outlier. As shown in FIG. 5, normal MSE 502 can be defined to be value that lie within 99% of the MSE normal distribution in the $win_{mse}$, with the remainder 504 labeled as an outlier. For example, in FIG. 6, MSE for the right-most data lies within 1% of the MSE normal distribution in the $win_{mse}$, which results in that data being labeled as an outlier 602.

This window-based outlier detection technique of the current invention is usable to calculate anomaly scores for each data in the smaller data subsequences. This approach is also able to capture different kinds of anomalies, such as an anomalous subsequence in a time series and an anomalous time series as a whole.

With regards to the step of updating a trained model, the current embodiment uses an off-line training model, which unlike the RL-based techniques, does not need a process to constantly train a model in each time step. The data is instead updated in an online and asynchronously manner when it is out-of-date and does not fit with the new traffic pattern anymore.

Figure 7:
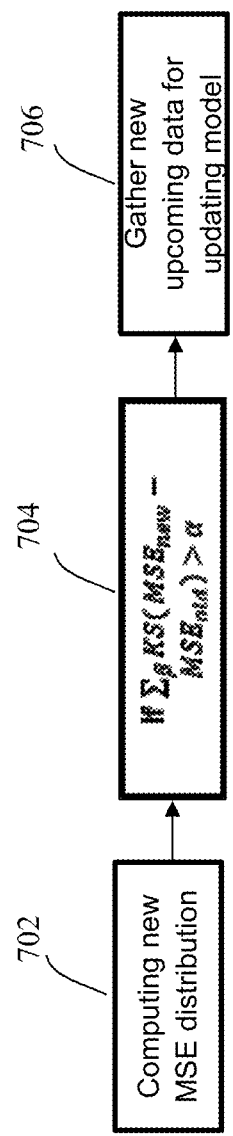
FIG. 7 illustrates an approach for updating of a model.

As shown in FIG. 7, the trained model is updated based on the computed MSE values. At 702, analyzing MSE changes can be performed after computing MSE for each data within $win_{mse}$. The approach, at 704, is to use Kolmogorov-Smirnov (KS) for comparing the difference between two MSE distributions. It should be noted that for avoiding a false drift detection, this approach only compares the MSE distributions on the normal data and not the outliers. This approach permits diagnosis of the necessity of updating a model. After comparing MSE normal distributions, if a model needs to get updated, then at 706, the approach stores new data and uses them for the model training purposes.

Figure 8:
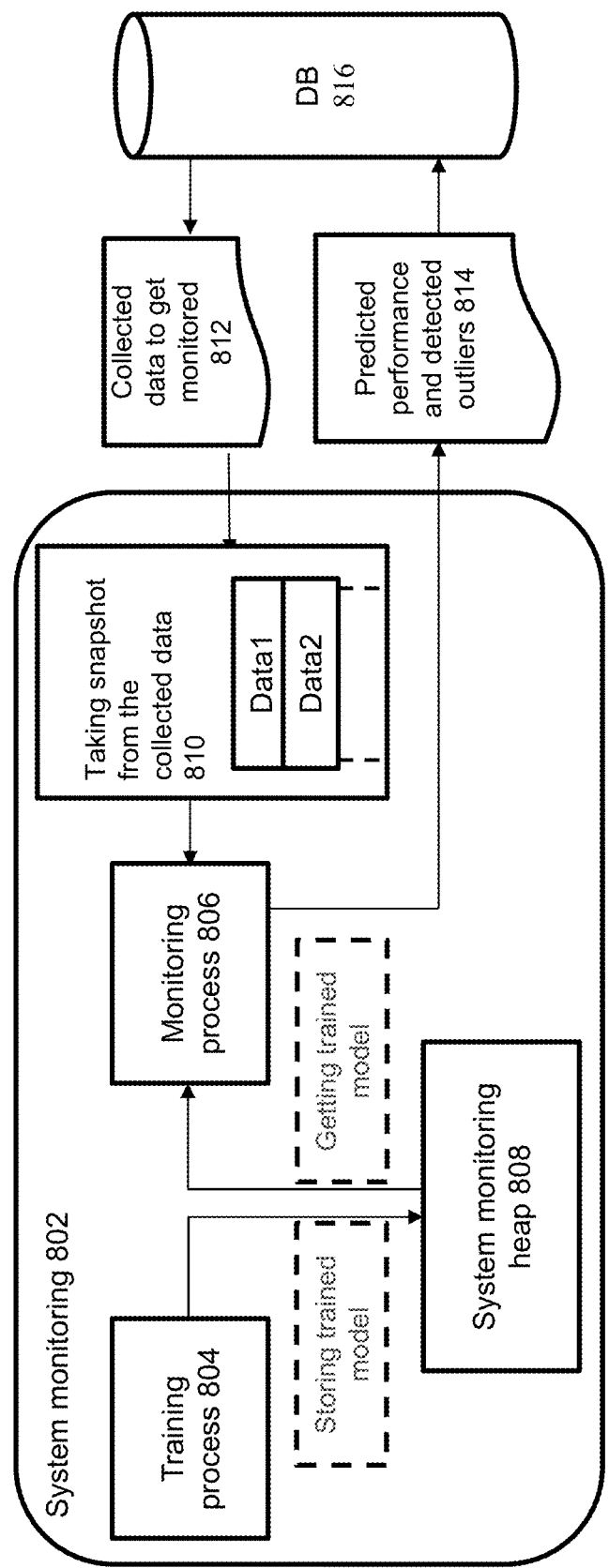
FIG. 8 show a more detailed illustration of an example architecture for implementing some embodiments of the invention.

FIG. 8 show a more detailed illustration of an example architecture for implementing some embodiments of the invention. Data 812 for monitoring purposes is collected from the database 816. The collected data includes, for example, network traffic data, waiting time data, and memory region grow pattern data. The network traffic data may be collected, for example, to monitor network behavior in a disaster recovery system between a primary system and a standby system (e.g., a primary DB and a standby DB) in order to detect any bad network behavior resulting in the congestion between these two systems. As another example, the data may be collected for a load balancing purposes for cloud resources, to monitor the traffic network to multiple servers and to predict their future traffic patterns in order to efficiently managing distributing client requests to certain servers to improve load-balance. The waiting time data may be collected, for example, to predict wait events and to detect their outliers in order to reduce waiting time and obtain more effective task scheduling. The memory region grow pattern data may be collected, for example, on behalf of a resource manager to efficiently determine the grow pattern in one or more shared memory regions for each process in a shared pool.

Module 810 takes the collected data 812, and feeds that data to the monitoring processes 806. It is noted that module 810 may provide data by taking snapshots from the collected data 812.

The monitoring processes perform the function of forecasting the system's future performance and perform outlier detection on given data. The data operated upon by the monitoring processes include state data provided by the database 816, which are stored in a memory region that is accessible for the monitoring processes 806. The monitoring processes 806 will use the trained model given from the training processes 804 for forecasting and outliers detection on the data.

The training processes take care of training the machine learning models based on a given data to learn data flow patterns. The trained model will be used by the monitoring process for analyzing data. The training processes 804 will also take care of updating a trained model if it is needed. The trained model's metadata will be stored in a memory region shared by the monitoring processes 806. In some embodiments, a memory heap 808 is provided to share data between the monitoring and training processes.

It is noted that various types of processing entities may be used to perform work within the inventive implementations. While the current description may refer to "process" or "processes" as the processing entities, it is noted that the inventive concepts may also be performed using other types of processing entities such as threads, tasks, computing nodes, cores, and/or any other entity capable of performing work in the system.

Figure 9:
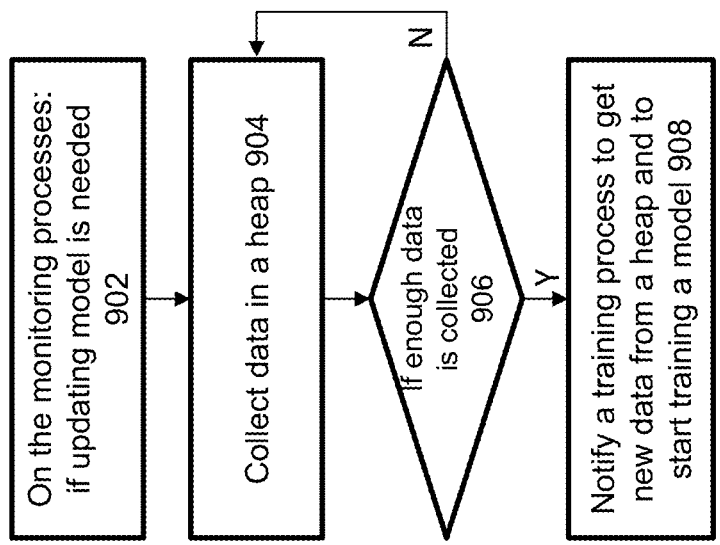
FIG. 9 shows a flowchart of an approach to operate the monitoring processes.

FIG. 9 shows a flowchart of an approach to operate the monitoring processes. At 902, on the monitoring processes, whenever the criteria for detecting the model drift is met, then at 904, these processes start collecting data for the training processes in the memory heap that is designed to be accessible via the training process. A determination is made at 906 whether enough data has been collected. If not, then the process continues at 904 to collect more data. If enough data has been collected, then at 908, the monitoring process notifies the training process, so then the training process can start training model using the new data.

Whenever a new model gets ready, the training process is therefore intending to update a model that the monitoring processes may be currently using. For this purpose, some embodiments provide an approach to asynchronously update a model without blocking the monitoring processes. The main purpose of this approach is to avoid a brownout as much as possible when updating a model. In other words, it is desirable to not stop the monitoring processes from accessing a trained model's metadata while the model is being updated. Instead, the goal is to keep the processes to continue reading a model's metadata while updating it safely.

One possible way to implement safe multi-process access on a model's metadata is to use locking, which requires acquiring and releasing locks whenever a process wants to read that data. However, acquiring and releasing locks add latency and overhead to each reading operation, which is not desirable. Also, using locks will serialize the processing so that only one process can read/write a data at a time, which results in an additional overhead in analyzing data. Moreover, if the data is time sensitive, then acquiring and releasing locks may impact the accuracy of a prediction in a negative way.

Figure 10:
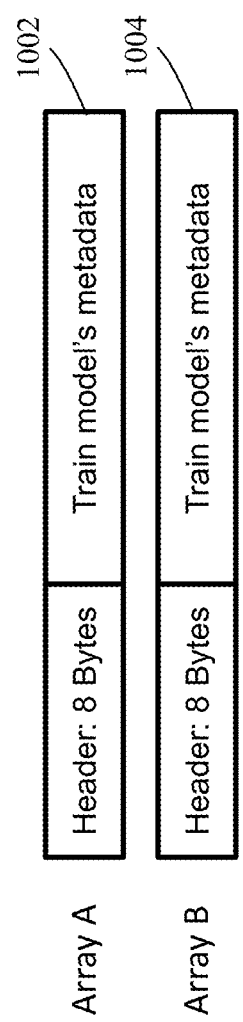
FIG. 10 illustrates arrays to store model metadata.

To resolve these issues, the current embodiment uses a lock-free approach for updating a model asynchronously using atomic operations. In the system monitoring component, a unique ID will get assigned for each monitoring process. As shown in FIG. 10, the trained model metadata will be stored in array 1002 (Array A) and array 1004 (Array B) with each having a header of, e.g., 8 bytes. These two arrays will be stored in a heap that are accessible to both the monitoring processes and the training processes.

Figure 11:
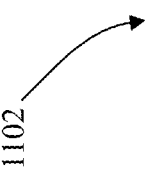
FIG. 11 illustrates details of an array.

In this header, as shown in FIG. 11, a bit is associated with each process ID. Whenever a process wishes to read data from that array, it first atomically sets a bit of its ID in the header of that array using a compare-and-swap (CAS) operation, and then it starts reading it. When that process finishes reading data from that array, it atomically unsets the same bit. For example, if the process with ID 3 wants to read data from that array, then the header will be as shown at 1102 in FIG. 11. Since each bit in the header is associated with only a single process ID in this embodiment, the maximum number of monitoring processes is the number of bits in the bitmap. Therefore, for the example in this figure, the maximum number of monitoring processes is 16.

Figure 12A:
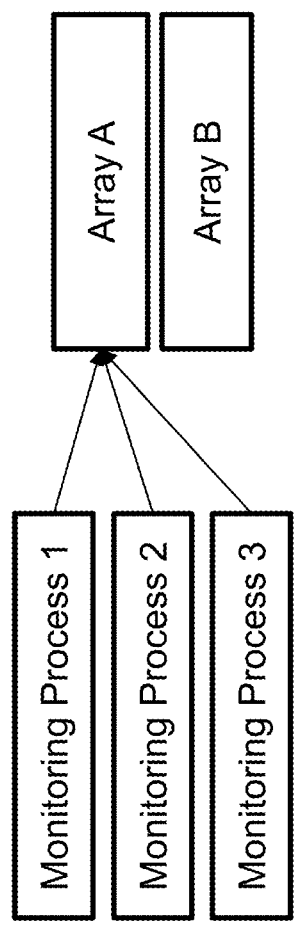
FIGS. 12A-12B illustrate swapping of pointers from a first array to a second array.
Figure 12B:
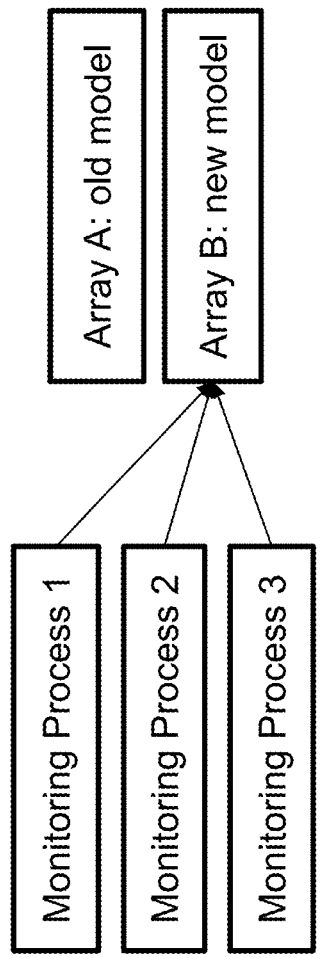

Initially all the processes read the trained parameters array A. For example, FIG. 12A shows three processes 1-3 reading data from the array A. When a training process finishes training a model, it will write the new trained model's metadata into array B. Since all the monitoring processes are reading data from array A, this means that it is safe to update array B. In this step, the training process atomically swaps the pointers from array A to array B. If array A still has the current readers, this means that one or more of the monitoring processes are still using the model from array A for analyzing their current data. However, eventually, all the monitoring processes will read data from an array B for analyzing new upcoming data, as shown in FIG. 12B.

Therefore, the header of an array A will eventually become zero, which means that it no longer has any readers. If it is required to update the model again, then the training process will update the model's metadata in array A, since all the monitoring processes are now reading the trained model's data from array B. The rest of the steps would repeat what was explained above.

If a monitoring process dies after setting up its related bit in the array's header, then this means that header will not get un-set by that process anymore. To avoid this situation, if a new monitoring process joins or if a monitoring process leaves, the training process will be notified of this fact. In this situation, if the dead monitoring process had set its related bit in one of the arrays, then it will get un-set with the training process.

Since the size of the arrays headers and also the size of each array's pointer are 8 bytes, a remote compare-and-swap using RDMA (remote direct memory access) operation can be also applied on them. This means that the updating approach can be implemented through a remote training node as well. This will help the system/database to avoid utilizing resources for the training step.

Figure 13:
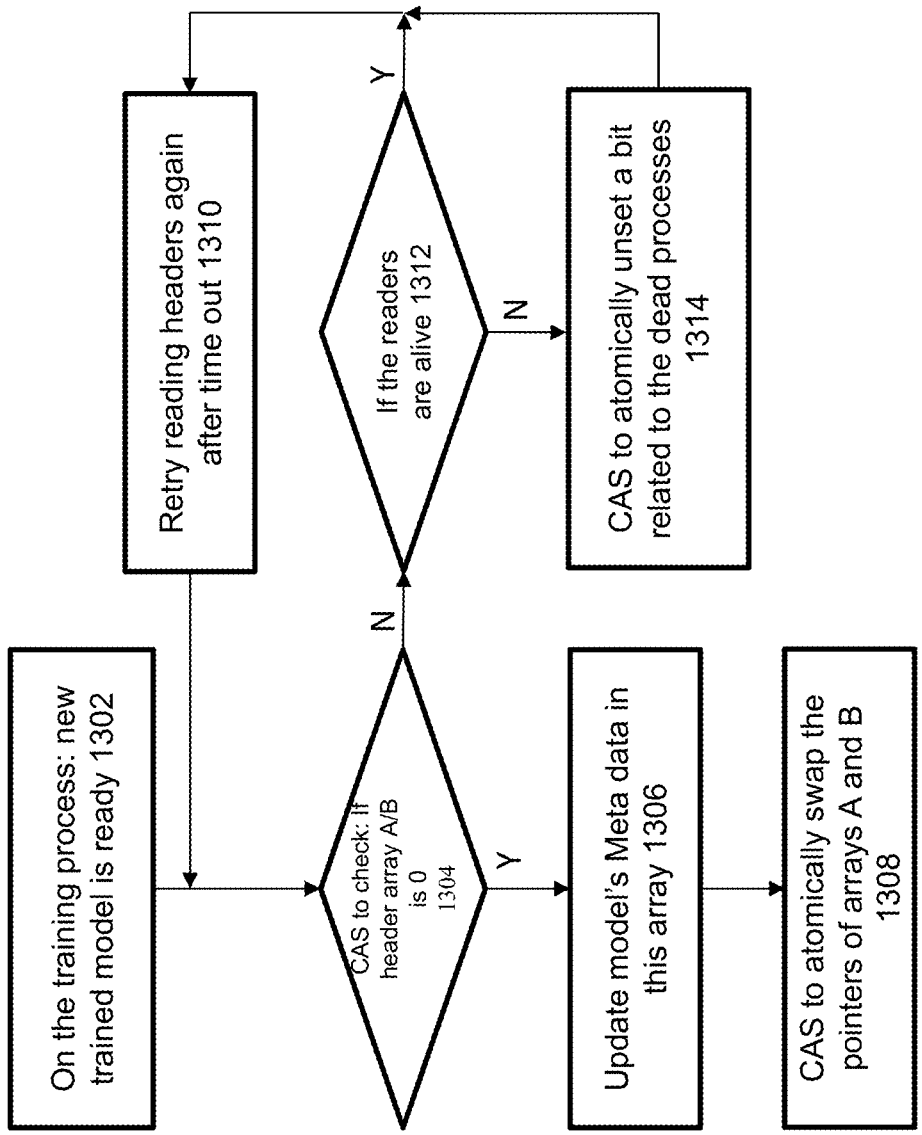
FIG. 13 shows a detailed flowchart for an approach to update a model asynchronously using atomic operations.

FIG. 13 shows a detailed flowchart for an approach to update a model asynchronously using atomic operations. At 1302, on the training process, the new trained model is ready for operational access. At 1304, during processing, a determination is made whether the header array A/B is at zero. CAS may be used to make this determination.

If the header array is not zero, this means that one or more readers may still be accessing the array. A further check is made at 1312 whether the one or more readers are alive. As noted above, it is possible that a process dies after setting up its related bit in the array's header, which means that the header will not be un-set by that process. In this situation, if the dead monitoring process had set its related bit in one of the arrays, then at 1314, the training process will unset the bit related to the dead process. If the readers are alive, then a 1310, a timeout period is taken, and then a retry occurs to check whether any readers are still accessing the array.

If at 1304 it is determined that the header array is zero, then this means that no readers are accessing the array. At this point, at 1306, the model's metadata will be updated in the array. Thereafter, at 1308, CAS can be used to atomically swap the pointers between the two arrays.

The two arrays can be implemented to be multi-threaded and remotely accessible in a safe manner as follow: (a) all the processes have access to both arrays: $arr_A$ and $arr_B$; (b) initially both arrays $arr_A$ and $arr_B$ contain the trained parameters; (c) each array has 8 bytes as a header, showing the number of readers reading data from that array at each time. The trained parameters stored in the two arrays pertain in some embodiments to the weights between the layers in the recurrent neural network.

To provide additional details of this approach, it is noted that if a process wishes wants to read an array, then it first atomically increments the header of that array by one, and at the end of its reading, it atomically decrements the header by one. Initially, it is assumed that all the processes read the trained parameters from $arr_A$. If updating the model is needed then certain additional steps are performed. If a model is going to be retrained on the same node, a new process will be launched for updating the arrays; otherwise, a new message is sent to the remote node for notifying it that data is ready for retraining model. If a model is trained on a local or remote node, that node swaps the array pointer of each process to $arr_B$, where if it is on a local node, then use local compare-and-swap but otherwise uses a remote (e.g., RDMA) compare-and-swap.

After the header of $arr_A$ becomes zero, it is safe to update the array. The new processes will use $arr_B$ for reading the trained parameters. This prevents incrementing a header of $arr_A$ and eventually it will become zero since no process is reading $arr_A$ anymore. Thus, it is safe to update $arr_A$. If it is a remote node, the approach uses RDBMA write for updating $arr_A$.

After updating $arr_A$, the local or remote node swaps the array pointer of each process to $arr_A$ using the same method as the previous step. This means that the processes will start using $arr_A$ again for reading the trained parameters.

The local/remote node waits until the header of $arr_B$ becomes zero. Then it updates this array too with the new trained parameters. If it is a remote node, then the approach uses RDBMA write for updating $arr_B$.

Therefore, what has been described is an improved approach to implement an improved offline learning approach that employs a window-based technique for predicting values within the window, and where outliers are identified and discarded from consideration. This approach efficiently permits offline learning to be employed in a manner that minimizes false positives, while also improving the quality of the data should retaining be required. The embodiments also provide an improved approach to implement model training that permits a model to be updated asynchronously using atomic operations.

System Architecture Overview

Figure 14:
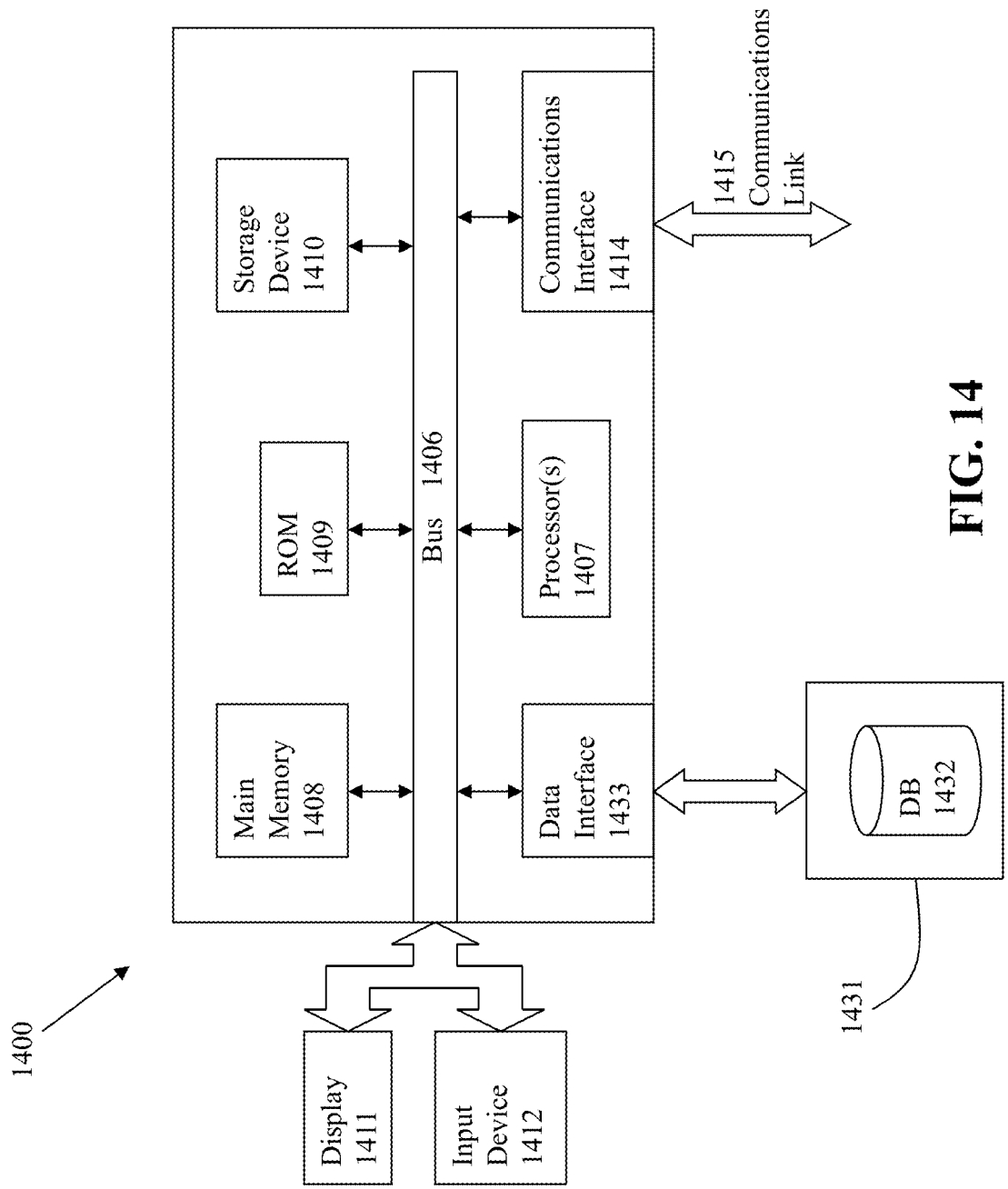
FIG. 14 is a block diagram of an illustrative computing system suitable for implementing an embodiment of the present invention.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 15:
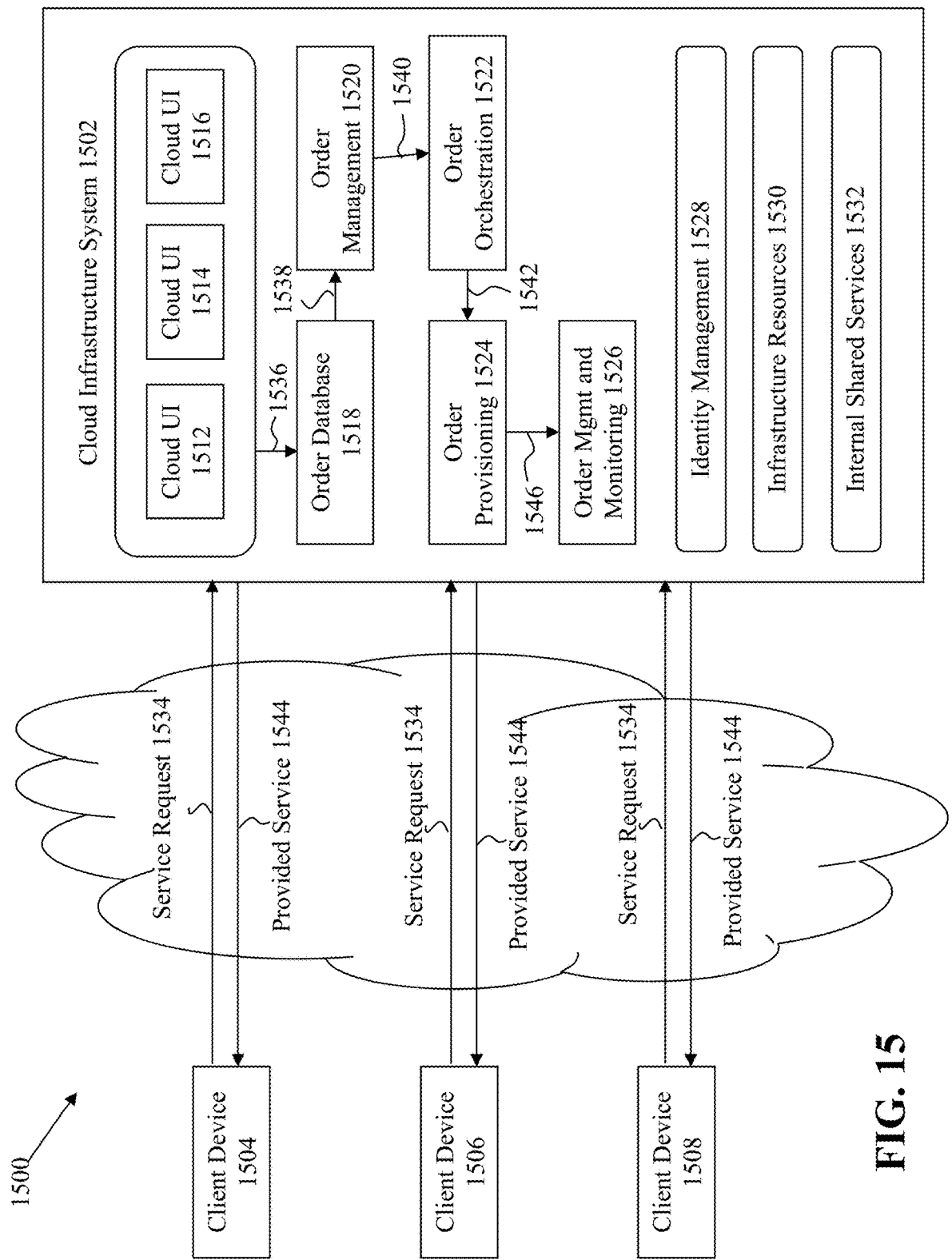
FIG. 15 is a block diagram of one or more components of a system environment in which services may be offered as cloud services, in accordance with an embodiment of the present invention.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described above for FIG. 14. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloudservices via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community.

The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for implementing machine learning in a computing system, comprising:
   executing a first sequence of processor instructions to fetch, from memory via a bus, a data stream pertaining to a monitored computer system;
   fetching and executing, from the memory bus via the bus using at least a trained machine learning model, a second sequence of processor instructions for:
      predicting data values to generate predicted data for the data stream;
      establishing one or more windows within received data stream fetched from the memory via the bus;
      comparing, within the one or more windows, signal data in the received data stream to the predicted data using an averaging function;
      detecting an outlier data value within the signal data at least by determining a distribution based at least in part on the averaging function;
      excluding the outlier data value from the signal data to generate reduced signal data; and
      detecting model drift for the trained machine learning model at least by computing a separate distribution on the reduced signal data using the averaging function; and
   updating the trained machine learning model if the model drift is detected.

2. The method of claim 1, wherein the outlier data value is determined by setting a threshold percentage of a normal distribution within a window.

3. The method of claim 1, wherein the outlier data value is not included for processing to update the trained machine learning model.

4. The method of claim 1, wherein the averaging function is a Mean Square Error (MSE) function.

5. The method of claim 1, wherein an offline learning method is applied to establish whether to update the trained machine learning model.

6. The method of claim 1, wherein the model drift is detected by determining whether two underlying one-dimensional probability distributions differ.

7. The method of claim 1, wherein the signal data corresponds to network traffic data, and the trained machine learning model is updated due to the model drift being based upon network traffic changes.

8. The method of claim 1, wherein the trained machine learning model is updated by swapping pointers between a first array and a second array, where a reader process atomically sets a bit in an array to access the array, and the pointers are swapped when zero processes are determined to be currently accessing the array.

9. The method of claim 1, wherein a memory region is shared between a training process and a monitoring process, wherein the monitoring process monitors the collected data stream, and the training process performs retraining for the trained machine learning model.

10. A system for implementing a machine learning system, comprising:
    a processor;
    a memory for holding programmable code; and
    wherein the programmable code includes instructions which, when executed by the processor, causes the processor to execute a set of acts, the set of acts comprising:
    executing a first sequence of processor instructions to fetch, from memory via a bus, a data stream pertaining to a monitored computer system;
    fetching and executing, from the memory bus via the bus using at least a trained machine learning model, a second sequence of processor instructions for:
       predicting data values to generate predicted data for the data stream;
       establishing one or more windows within received data stream fetched from the memory via the bus;
       comparing, within the one or more windows, signal data in the received data stream to the predicted data using an averaging function;
       detecting an outlier data value within the signal data at least by determining a distribution based at least in part on the averaging function;
       excluding the outlier data value from the signal data to generate reduced signal data; and
       detecting model drift for the trained machine learning model at least by computing a separate distribution on the reduced signal data using the averaging function; and
    updating the trained machine learning model if the model drift is detected.

11. The system of claim 10, wherein the outlier data value is determined by setting a threshold percentage of a normal distribution within a window.

12. The system of claim 10, wherein the outlier data value is not included for processing to update the trained machine learning model.

13. The system of claim 10, wherein the averaging function is a Mean Square Error (MSE) function.

14. The system of claim 10, wherein an offline learning method is applied to establish whether to update the trained machine learning model.

15. The system of claim 10, wherein the model drift is detected by determining whether two underlying one-dimensional probability distributions differ.

16. The system of claim 10, wherein the signal data corresponds to network traffic data, and the trained machine learning model is updated due to the model drift being based upon network traffic changes.

17. The system of claim 10, wherein the trained machine learning model is updated by swapping pointers between a first array and a second array, where a reader process atomically sets a bit in an array to access the array, and the pointers are swapped when zero processes are determined to be currently accessing the array.

18. The system of claim 10, wherein a memory region is shared between a training process and a monitoring process, wherein the monitoring process monitors the collected data stream, and the training process performs retraining for the trained machine learning model.

19. A computer program product embodied on a non-transitory computer readable medium, the non-transitory computer readable medium having stored thereon a sequence of instructions which, when executed by a processor, executes a set of acts, the set of acts comprising:
   executing a first sequence of processor instructions to fetch, from memory via a bus, a data stream from pertaining to a monitored computer system;
   fetching and executing, from the memory bus via the bus using to least a trained machine learning model, a second sequence of processor instructions for:
      predicting data values to generate predicted data for the data stream;
      establishing one or more windows within received data stream fetched from the memory via the bus;
      comparing, within the one or more windows, signal data in the received data stream to the predicted data using an averaging function;
      detecting an outlier data value within the signal data at least by determining a distribution based at least in part on the averaging function;
      excluding the outlier data value from the signal data to generate reduced signal data; and
      detecting model drift for the trained machine learning model at least by computing a distribution on the reduced signal data using the averaging function; and
      updating the trained machine learning model if the model drift is detected.

20. The computer program product of claim 19, wherein the outlier data value is determined by setting a threshold percentage of a normal distribution within a window.

21. The computer program product of claim 19, wherein the outlier data value is not included for processing to update the trained machine learning model.

22. The computer program product of claim 19, wherein the averaging function is a Mean Square Error (MSE) function.

23. The computer program product of claim 19, wherein an offline learning method is applied to establish whether to update the trained machine learning model.

24. The computer program product of claim 19, wherein the model drift is detected by determining whether two underlying one-dimensional probability distributions differ.

25. The computer program product of claim 19, wherein the signal data corresponds to network traffic data, and the trained machine learning model is updated due to the model drift being based upon network traffic changes.

26. The computer program product of claim 19, wherein the trained machine learning model is updated by swapping pointers between a first array and a second array, where a reader process atomically sets a bit in an array to access the array, and the pointers are swapped when zero processes are determined to be currently accessing the array.

27. The computer program product of claim 19, wherein a memory region is shared between a training process and a monitoring process, wherein the monitoring process monitors the collected data stream, and the training process performs retraining for the trained machine learning model.

\* \* \* \* \*

UNITED STATES PATENT AND TRADEMARK OFFICE
CERTIFICATE OF CORRECTION

PATENT NO. : 11,631,012 B2  
APPLICATION NO. : 16/917720  
DATED : April 18, 2023  
INVENTOR(S) : Khatami et al.

Page 1 of 1

It is certified that error appears in the above-identified patent and that said Letters Patent is hereby corrected as shown below:

In the Claims

In Column 19, Line 15, in Claim 19, after "stream" delete "from".

In Column 19, Line 18, in Claim 19, delete "to" and insert -- at --, therefor.

Signed and Sealed this  
Twenty-third Day of April, 2024

Katherine Kelly Vidal  
*Director of the United States Patent and Trademark Office*